Figure 4:
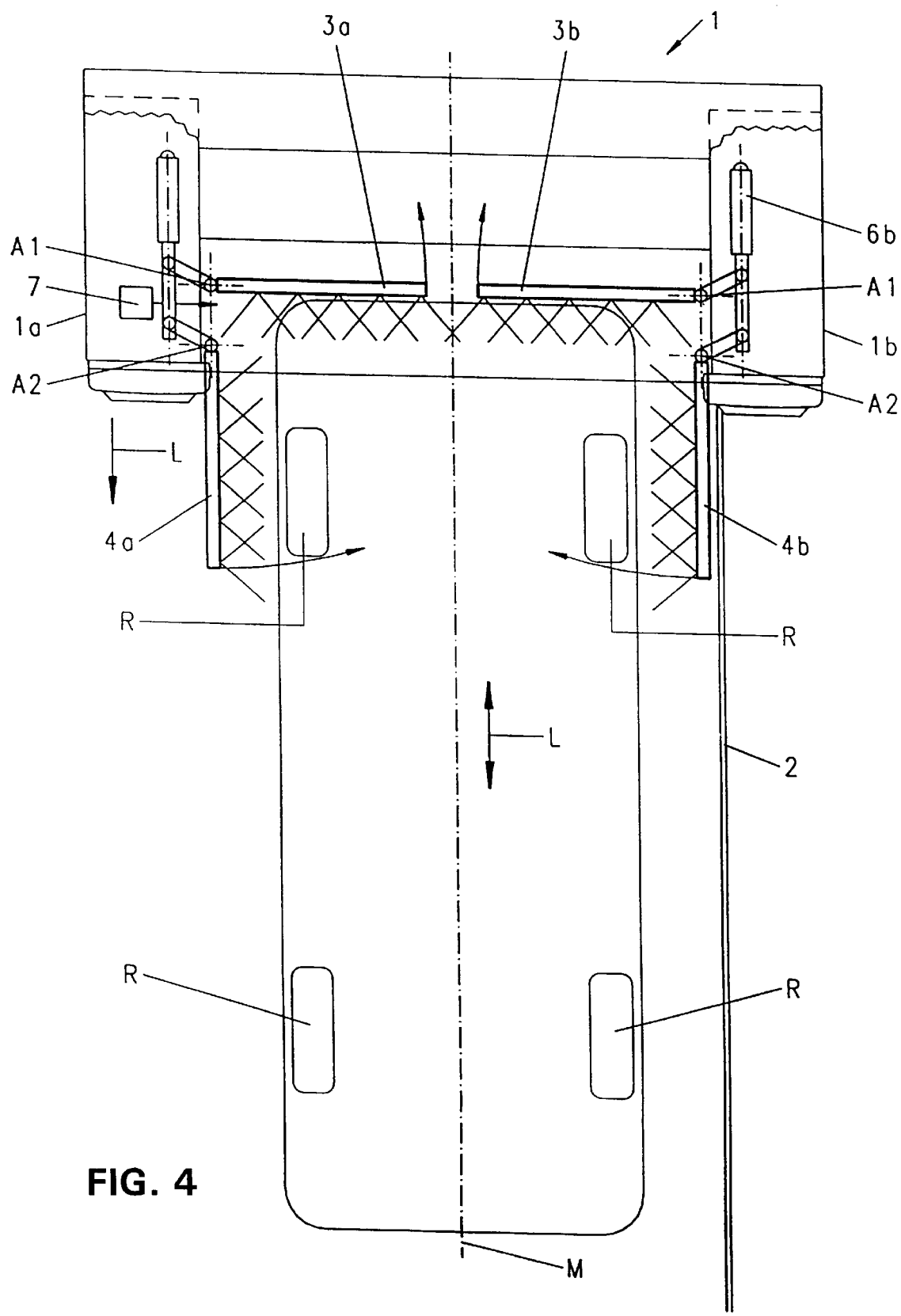

United States Patent
Decker

[11] Patent Number: 6,055,994
[45] Date of Patent: May 2, 2000

[54] UNDERBODY WASHING DEVICE FOR MOTOR VEHICLES

[75] Inventor: Wolfgang Decker, Zusmarshausen-Wollbach, Germany

[73] Assignee: Wesumat Fahrzeugwaschanlagen GmbH, Augsburg, Germany

[21] Appl. No.: 09/210,069

[22] Filed: Dec. 11, 1998

[30] Foreign Application Priority Data

Dec. 18, 1997 [DE] Germany ............................ 197 56 424
Sep. 3, 1998 [DE] Germany ............................ 198 40 158

[51] Int. Cl.$^7$ ...................................................... B08B 3/02
[52] U.S. Cl. ............................ 134/45; 134/123; 134/181; 134/56 R
[58] Field of Search ............................... 134/45, 123, 172, 134/181, 56 R; 15/DIG. 2; 239/263.1, 263, 264

[56] References Cited

U.S. PATENT DOCUMENTS

| | | | |
|---|---|---|---|
| 2,716,767 | 9/1955 | Davis | 134/123 |
| 2,716,772 | 9/1955 | Cockrell | 134/45 |
| 3,446,217 | 5/1969 | Collier | 134/45 |
| 3,448,717 | 6/1969 | Kuhlman | 134/45 |
| 3,667,486 | 6/1972 | Cole et al. | 134/45 |
| 3,670,743 | 6/1972 | Moore | 134/45 |
| 4,269,141 | 5/1981 | Kennett | 134/123 |
| 4,889,147 | 12/1989 | Chandler | 134/123 |
| 4,916,771 | 4/1990 | Weigele | 15/DIG. 2 |
| 4,971,084 | 11/1990 | Smith et al. | 134/123 |
| 4,972,862 | 11/1990 | Belanger et al. | 134/123 |
| 5,341,828 | 8/1994 | Ferguson, Sr. | 134/123 |

FOREIGN PATENT DOCUMENTS

| | | |
|---|---|---|
| 1 239 203 | 4/1967 | Germany . |
| 722786 | 3/1980 | U.S.S.R. ............................ 134/123 |
| 1442258 | 7/1976 | United Kingdom ................ 134/123 |
| 2118116 | 10/1983 | United Kingdom ................ 134/123 |

OTHER PUBLICATIONS

Company brochure "Bestseller" issued by Oy Tammermatic Ab, FI–33101 Tammerfors, Finland (8 sheets).

*Primary Examiner*—Frankie L. Stinson
*Attorney, Agent, or Firm*—Flynn, Thiel, Boutell & Tanis, P.C.

[57] ABSTRACT

In this underbody washing device for motor vehicles, on a frame which is movable relative to the vehicle (F) in the latter's longitudinal direction (L) there are provided two pairs of spraying arms (3a, 3b; 4a, 4b) fitted with multiple spray nozzles, which arms are each pivotably disposed about a vertical pivoting axis (A1, A2) near to the ground on opposing sides (1a, 1b) of the frame. To the spraying arms (3a, 3b; 4a, 4b) are assigned actuating motors (6a, 6b), by means of which the spraying arms can be swung in under the base of the vehicle into their swung-in position running transversely to the longitudinal direction of the vehicle (L) and swung out into a second, swung-out position running parallel to the longitudinal direction of the vehicle (L). In addition, there is provided a control device (7) which detects the vehicle wheels (R) and acts on the actuating motors (6a, 6b), by means of which control device the spraying arms are drivable by the actuating motors in such a way that each of the spraying arms (3a, 3b; 4a, 4b) may be swung out from its swung-in position into its swung-out position before reaching a vehicle wheel (R), is held in its swung-out position while passing the vehicle wheel, and can be brought back into its swung-in position after passing the vehicle wheel.

10 Claims, 5 Drawing Sheets

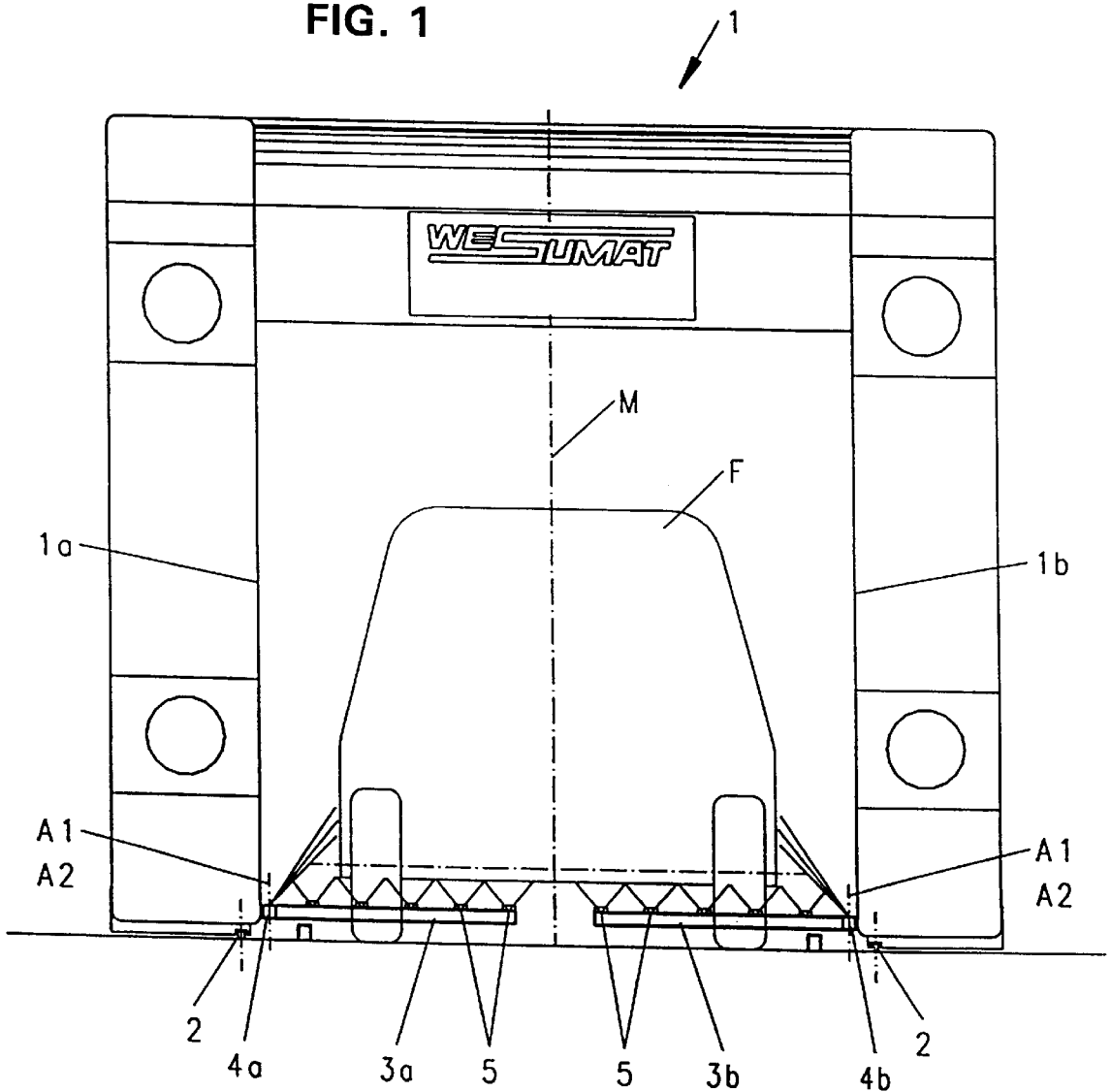

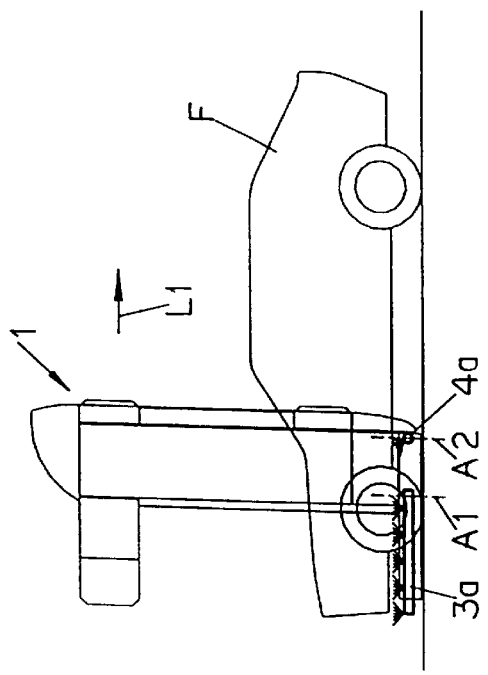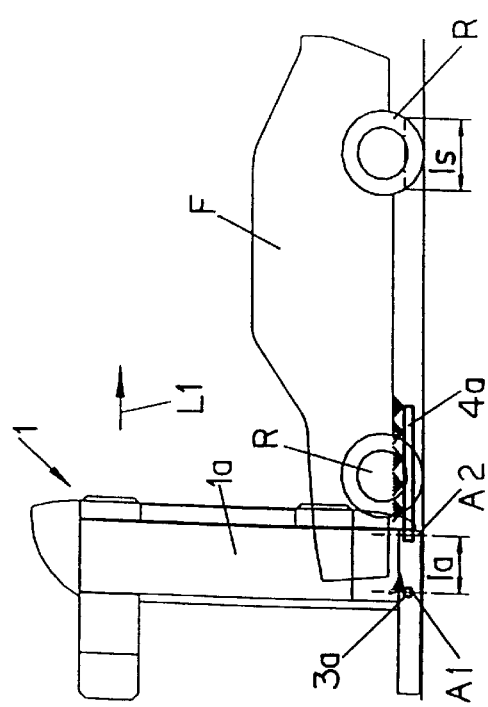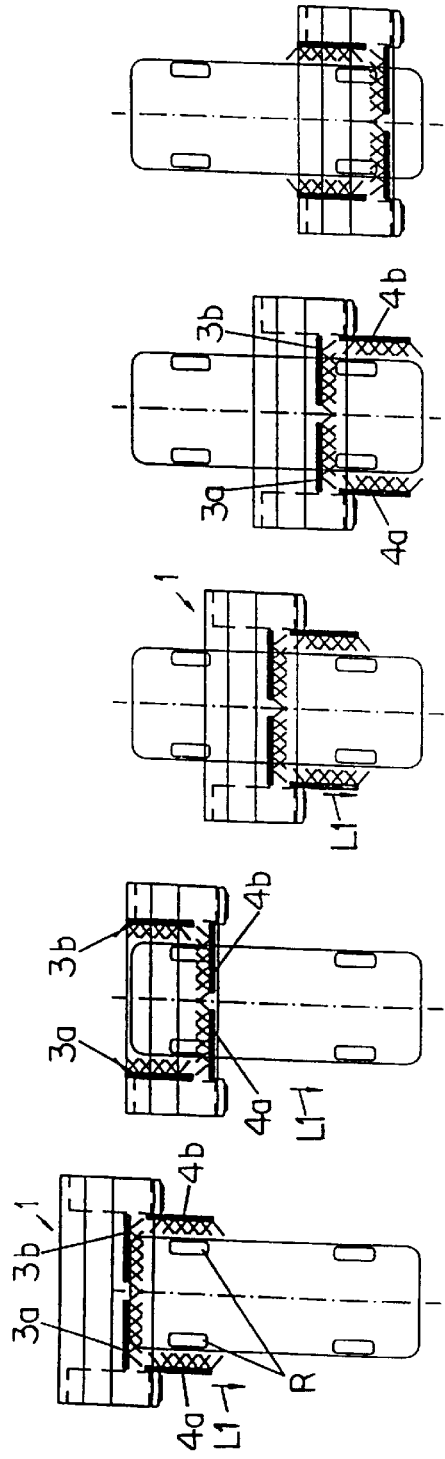

FIG. 6a
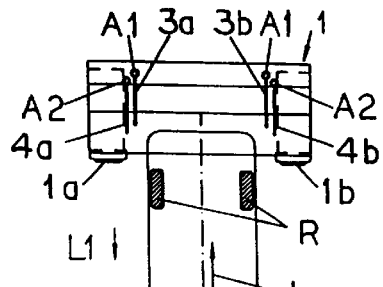
FIG. 6b
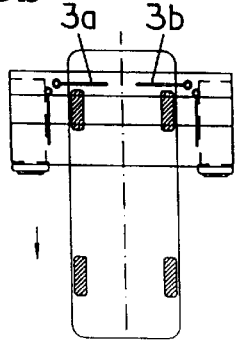
FIG. 6c
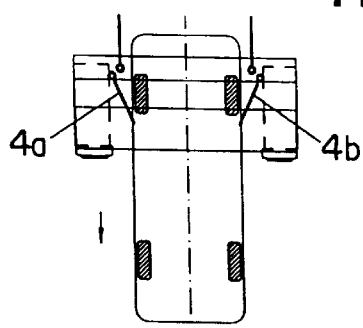
FIG. 6d
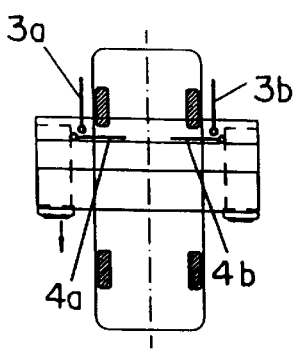
FIG. 6e
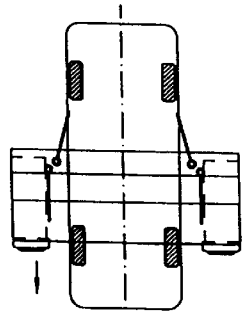
FIG. 6f
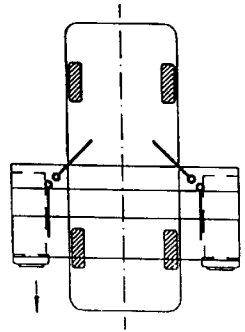
FIG. 6g
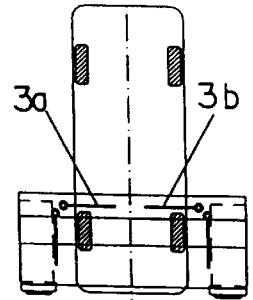
FIG. 6h
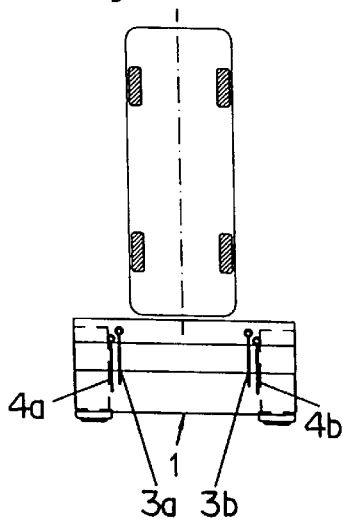
FIG. 6i
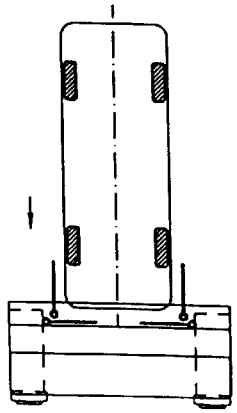
FIG. 6j

UNDERBODY WASHING DEVICE FOR MOTOR VEHICLES

The invention relates to an underbody washing device for motor vehicles with at least one frame which is movable relative to the vehicle in the latter's longitudinal direction and with a pair of spraying arms fitted with multiple spray nozzles, of which arms one each is pivotably disposed about a vertical pivoting axis near to the ground on opposing sides of the frame (sides of the vehicle) and can be swung out from a swung-in position running transversely to the longitudinal direction of the vehicle under the base of the vehicle towards the side of the frame.

In the case of a known underbody washing device of this kind (cf. company brochure "BESTSELLER" issued by Oy Tammermatic Ab, FI-33101 Tammerfors, Finland) the spraying arms are each located on one of the two uprights of a washing gantry which is movable in relation to the vehicle and are held by spring force in their position running transversely to the longitudinal direction of the vehicle. As soon as the spraying arms come in contact with a vehicle wheel, they are swung out by the vehicle wheel in question towards the side of the frame against the spring force. However, they can only swing back in under the base of the vehicle under spring force when the entire length of the spraying arm in question has moved past the vehicle wheel and the free end of the spraying arm loses contact with the vehicle wheel. As a result, not only the region between opposing vehicle wheels remains unwashed, but also a portion of the region of the underbody which adjoins the vehicle wheels. If it is desired to wash this portion as well, this can only be done by running the gantry back; this, however, prolongs the washing process and adversely affects any washing or pre-wash process which may be running at the same time.

The same drawbacks are exhibited by a similar known underbody washing device according to DE-AS 1 239 203. In this device the spraying arm consists of a flexible pipe provided at its end with a spray head, this pipe being surrounded by an elastic mounting in the form of a helical spring. This spraying arm is located on a bogie which is led around the stationary vehicle along a closed path, this bogie also carrying a vertical brush and a horizontal brush which extends over half the width of the car. Normally the spraying arm projects from the side into the space between the vehicle underbody and the washing bay floor. As soon as the elastic spraying arm touches a vehicle wheel, it is elastically deflected and during the continued movement of the bogie is carried along the outer face of the vehicle wheel in question. In another version of this known underbody washing device, on a gantry-like bogie which envelopes the vehicle wheel in a U shape, an elastic spraying arm of this kind is located on each of the two gantry uprights, so that the two opposing spraying arms form a pair, in similar fashion to the underbody washing device described at the start.

The object of the invention is therefore to provide an underbody washing device for motor vehicles of the above-mentioned kind, with which the underbody wash can be executed with continuous relative movement between vehicle and frame without adversely affecting any washing or pre-wash process which may be running simultaneously with a time saving and improved washing results.

According to the invention this object is achieved in that a second, similar pair of spraying arms is also pivotably disposed about vertical pivoting axes on the opposing sides of the frame, that the spraying arms have assigned thereto actuating motors by means of which the spraying arms can be swung under the base of the vehicle into their swung-in position running transversely to the longitudinal direction of the vehicle and swung out into a second, swung-out position running parallel to the longitudinal direction of the vehicle, and that there is provided a control device which detects the vehicle wheels and acts on the actuating motors, by means of which control device the spraying arms are drivable by the actuating motors in such a way that each of the spraying arms can be swung out from its swung-in position into its swung-out position before reaching a vehicle wheel, is held in its swung-out position while passing the vehicle wheel, and can be brought back into its swung-in position after passing the vehicle wheel.

This design enables a motor vehicle's underbody to be washed fully and thoroughly with continuous relative movement between vehicle and frame, i.e. without the return movement of a gantry, and hence also without interrupting any washing or pre-wash process. Regions of the underbody which are not washed by the first pair of spraying tubes can be reached by the spray jets of the second pair of spraying tubes, as the swing-in and swing-out movements of the first spraying arm located on one side of the frame always take place in the opposite rotational direction to the swing-in and swing-out movements of the second spraying arm located on the same side of the frame. Many regions of the underbody are thus consecutively washed by both spraying arms located on one side of the frame. Moreover, better cleaning of the lower side regions of the motor vehicle is achieved, because one of the spraying tubes is always in its swung-out position parallel to the longitudinal direction of the vehicle and its spray jets wash the lower side regions while the second spraying arm is swung in under the base of the vehicle and washes the underbody. Dispensing with the return movement of the gantry also shortens the washing process. Lastly, the underbody washing device as per the invention can be employed not only in gantry-type washing installations but also in conveyorised car washes, which also brings benefits compared with fixed spraying tubes. As no constructional measures have to be taken for this, existing washing installations can be retrofitted; this applies both to gantry-type washing installations and to conveyorised car washes.

Advantageous developments of the invention are characterised in the dependent claims.

Figure 7A:
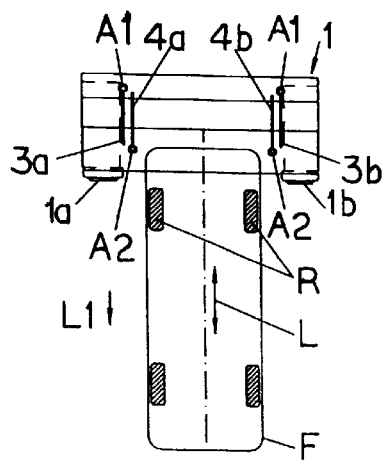
Figure 7D:
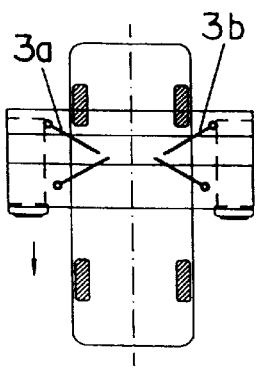
Figure 7G:
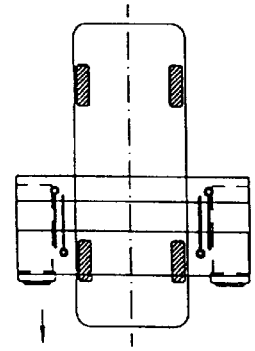
Figure 7B:
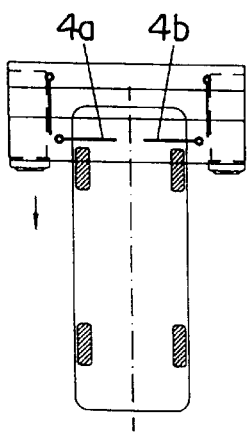
Figure 7E:
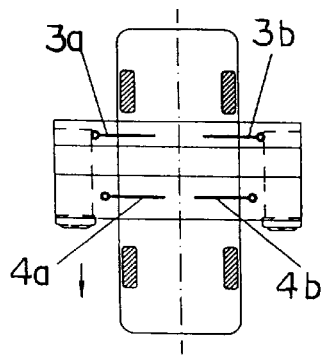
Figure 7H:
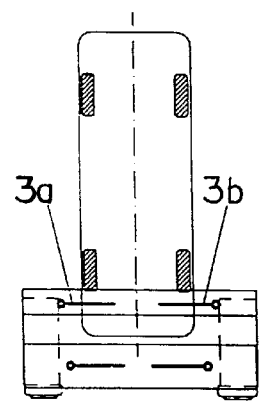
Figure 7C:
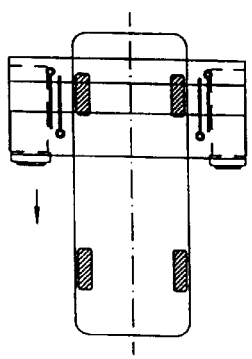
Figure 7F:
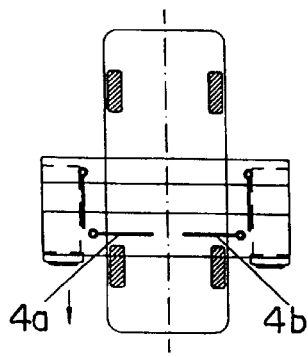
Figure 7I:
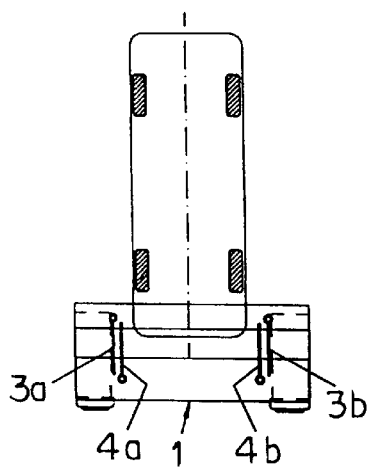

The invention will now be explained in detail with reference to example embodiments, which are illustrated in conjunction with a gantry-type washing installation, where:

FIG. 1 shows the front view of the gantry of a gantry-type washing installation with a first embodiment of an underbody washing device located thereon in starting position, FIG. 2 shows the associated side view, FIG. 3 shows a further side view in a second operating position of the gantry, FIG. 4 shows a top view of vehicle and gantry in the latter's starting position, FIG. 5a)–e) shows a top view of the vehicle and the gantry in various consecutive operating positions of the gantry, FIG. 6a)–j) and FIG. 7a)–i) show two further embodiments, each in a top view of the gantry and the vehicle in various consecutive operating positions of the gantry.

The gantry 1 may comprise normal washing devices such as horizontal brushes, vertical brushes and/or high pressure cleaning devices, drying equipment and the like. These are not illustrated as they are conventional items of equipment. The gantry is movably supported on rails 2 in the longitudinal direction of the vehicle L or in the direction of the vehicle's longitudinal mid-plane M. The gantry is moved back and forth along these rails during the washing of the vehicle, while the vehicle is at rest. As the underbody washing device as per the invention may however also be used on a fixed frame in a conveyorised car wash in which the vehicle is pulled through by conveying chains, in the claims the term "frame" has been used, by which is meant both a fixed frame in a conveyorised car wash and a movable gantry in a gantry-type washing installation. The expression "side of the frame" is therefore synonymous with "side of the gantry" or "gantry upright".

In the gantry 1, two pairs of spraying arms 3a, 3b and 4a, 4b are pivotably disposed near to the ground on the opposing sides 1a, 1b of the gantry. Spraying arms 3a, 3b are pivotable about vertical axes A1; spraying arms 4a, 4b are pivotable about vertical axes A2. In this embodiment, the axes A1, A2 are arranged offset in relation to each other spaced at a distance a in the longitudinal direction of the vehicle. Each of the spraying arms 3a, 3b and 4a, 4b features multiple nozzles 5. By swinging spraying arms 3a, 3b about their vertical pivoting axes A1 and spraying arms 4a, 4b about their vertical pivoting axes A2, the spraying arms can be brought alternately into a position running transversely to the longitudinal direction L of the vehicle, referred to as the swung-in position, or into a position running parallel to the longitudinal direction of the vehicle, referred to as the swung-out position. In FIG. 4, the two spraying arms 3a, 3b are illustrated in their swung-in position, whereas spraying arms 4a, 4b are depicted in their swung-out position.

To swing the spraying arms 3a, 3b and 4a, 4b, each spraying arm can be assigned a separate actuating motor. In the advantageous embodiment illustrated in FIG. 4 the two spraying arms 3a and 4a located on one side 1a of the gantry have assigned thereto a common actuating motor 6a, e.g. a pressurised cylinder, and the two spraying arms 3b and 4b located on the other side of the frame have assigned thereto a common actuating motor 6b. A prerequisite for this is that the pivoting axes A1 and A2 are spaced at a sufficient distance a, which should be rather greater than the length s of the horizontal chord of a vehicle wheel R at the level of the spraying arms (cf. FIG. 2). By this means it is ensured that on one and the same side 1a or 1b of the gantry the spraying arms 3a, 4a or 3b, 4b respectively are swung in or out at the right moment.

In addition, there is provided in the gantry 1 a control device 7 which detects the vehicle wheels, e.g. by means of a photocell or an infra-red transmitter, and which acts on the actuating motors 6a, 6b in the manner described even more fully below. By means of the actuating motor 6a the two spraying arms 3a, 4a which are pivotably supported on the same side 1a of the gantry can each be swung in the same rotational direction, but in doing so the one spraying arm, e.g. spraying arm 4a, is swung in while the other spraying arm 3a is swung out and vice versa.

This mode of operation will now be described even more fully with reference to the operating sequence illustrated in FIG. 5a)–e).

In FIG. 5a), the gantry is illustrated in its starting position, the vehicle F being in front of the gantry. Spraying arms 4a, 4b are in their swung-out position parallel to the vehicle's longitudinal direction L, while spraying arms 3a, 3b are in their swung-in positions. At the start of the washing operation, the lower region of the vehicle's nose is washed by spraying arms 3a, 3b, while spraying arms 4a, 4b wash the lower region of the vehicle's sides. During the movement of the gantry 1 in the direction L1, spraying arms 3a, 3b wash the underbody until they come close to the front wheels R of the vehicle. As the spray jets of the spraying arms 3a in swung-in position are inclined obliquely upwards and towards the rear region of the vehicle F, part of the region of the underbody situated between the front wheels R is also washed. As soon as the sensor of the control device 7 detects the front wheel R, the actuating motors 6a, 6b are activated by the control device 7. As shown in FIG. 5b), they swing the spraying arms 3a, 3b outward into their swung-out position, while spraying arms 4a, 4b are brought into their swung-in position.

The spray nozzles 5 are expediently each positioned on the spraying arms 3a, 3b and 4a, 4b such that in swung-out position their spray jets are directed obliquely upwards towards the vehicle, as is also apparent from FIG. 1. By this means the lower side parts of the vehicle are washed with the spraying arms in swung-out position. Simultaneously, however, this also has the effect that when spraying arms 3a, 3b are in swung-in position their spray jets are directed obliquely backwards and upwards and when spraying arms 4a, 4b are in swung-in position their spray jets are directed obliquely forwards and upwards in relation to the vehicle F. By this means, with spraying arms 3a, 3b in the position illustrated in FIG. 5a), firstly the nose region is washed up to the level of the bumper and spraying arms 4a, 4b wash the region of the underbody situated between the front wheels R, unless it has already been washed by spraying arms 3a, 3b as described above. As spraying arms 4a, 4b are brought into their swung-in position immediately after passing the front wheels, even during further movement of the gantry in the direction L1 the region of the underbody directly adjoining the front wheels is washed. Simultaneously the swung-out spraying arms 3a, 3b wash the lower side regions of the vehicle. As soon as the swung-out spraying arms 3a, 3b have passed the front wheels, which can be detected by a further sensor on the gantry, the actuating motors 6a, 6b are again activated. They swing spraying arms 3a, 3b in again and spraying arms 4a, 4b out again in good time before they reach the region of the rear wheels, as is illustrated in FIG. 5c). The gantry 1 is moved further with spraying arms 3a, 3b swung in up to the position shown in FIG. 5d), where the operation described with regard to the front wheels is then repeated and spraying arms 3a, 3b are swung out again and spraying arms 4a, 4b swung in again as shown in FIG. 5e). With the spraying arms in this position the washing operation is continued until the lower tail region of the vehicle and also the tail up to bumper level has been washed by spraying arms 4a, 4b. FIG. 2 illustrates a side view of the gantry and the vehicle, the gantry being approximately in the position illustrated in FIG. 4 and FIG. 5a), while FIG. 3 corresponds to the gantry position shown in FIG. 5b). Optionally, the two spraying arms provided on the same side of the frame can also be pivotably disposed about a common vertical axis.

It is also possible to place the two spraying arms provided on the same side of the frame at right angles to each other and to connect them rigidly. In such a case the rigidly connected spraying arms could be swung by means of a common actuating motor; this actuating motor should be designed such that it slowly swings both swinging arms while moving past a vehicle wheel. By this means the one swinging arm, which was initially in its swung-in position under the base of the vehicle, is slowly swung out, while the other swinging arm is simultaneously swung in.

In the embodiments illustrated in FIGS. 6 and 7, parts with the same function have the same reference symbols that were assigned thereto for the embodiment described in the foregoing as per FIGS. 1 to 5, so that the above description essentially applies analogically.

In the embodiment illustrated in FIG. 6, however, the pivoting axes A1, A2 of the two spraying arms 3a, 4a or 3b, 4b located on the same side 1a or 1b, respectively, of the frame are located adjacent to each other above or alongside each other. To swing them, each spraying arm is assigned a separate actuating motor. In the starting position of the gantry 1, as shown in FIG. 6a, all the spraying arms are in swung-out position parallel to the longitudinal direction L of the vehicle. Before the washing operation starts, spraying arms 3a, 3b are swung in as shown in FIG. 6b). They wash the underbody from the start of the vehicle up to the front wheel R. On reaching the latter, spraying arms 3a, 3b are swung out as shown in FIG. 6c), and spraying arms 4a, 4b swing in. FIG. 6d) shows spraying arms 4a, 4b in fully swung-in state. The obliquely backwards directed spray jets of swinging arms 3a, 3b and the obliquely forwards directed spray jets of swinging arms 4a, 4b result in an overlap of the spray jets in the region between the front wheels R, so that this region is also washed well. After passing the front wheels, spraying arms 3a, 3b are swung in again as shown in FIG. 6e) and spraying arms 4a, 4b are swung out. Spraying arms 3a, 3b then wash the underbody until the rear wheels are reached, where the operation described with regard to the front wheels is repeated as shown in FIG. 6h) and i). Spraying arms 3a, 3b are swung out, spraying arms 4a, 4b are swung in. They wash the underbody up to the end of the vehicle. In final position, all the spraying arms are then brought into their swung-out position as shown in FIG. 6j). In short washing bays swinging arms 3a, 3b may also remain in their swung-out position as shown in FIG. 6i); not until the gantry 1 has again attained its starting position shown in FIG. 6a), are they swung back into the position illustrated there.

In the embodiment illustrated in FIG. 7 the pivoting axes A1 and A2 of the two spraying arms 3a, 4a or 3b, 4b located on the same side 1a or 1b, respectively, of the frame are located a reciprocal distance apart which approximately corresponds to the length of one of the spraying arms or can also be greater. Here too, each spraying arm has assigned thereto a separate actuating motor. In the starting position of gantry 1, as shown in FIG. 7a), all the spraying arms are in swung-out position parallel to the longitudinal direction L of the vehicle. Before the washing operation starts spraying arms 4a, 4b are swung in. They wash the underbody from the nose of the vehicle up to the front wheels R, as shown in FIG. 7b). On reaching the front wheels, swinging arms 4a, 4b are swung out. After passing the front wheels spraying arms 3a, 3b are swung in as shown in FIG. 7d) Simultaneously, spraying arms 4a, 4b are also swung in. They wash the underbody until the rear wheels are reached. As shown in FIG. 7f), spraying arms 3a, 3b are swung out again in good time before the rear wheels are reached. After passing the rear wheels, they are swung in again as shown in FIG. 7h) and wash the underbody from the rear wheels to the end of the vehicle. All the spraying arms are then swung back into their starting positions as shown in FIG. 7i).

Also with regard to the embodiments illustrated in FIGS. 6 and 7, by means of the oblique position of the spray nozzles 5, which are each disposed on the spraying arms 3a, 3b and 4a, 4b such that in swung-out position their spray jets are directed obliquely upwards towards the vehicle, it is achieved that no water is sprayed onto the ceiling of the bay, an overlapping wash is ensured on changing of the spraying arms in the wheel region and with swung-out spraying arms the sill region of the vehicle is cleaned at high pressure.

What is claimed is:

1. Underbody washing device for motor vehicles, with at least one frame which is movable relative to the vehicle in the latter's longitudinal direction and with a pair of spraying arms fitted with multiple spray nozzles, of which arms one each is pivotably disposed about a vertical pivoting axis near to the ground on opposing sides of the frame and can be swung out from a swung-in position running transversely to the longitudinal direction of the vehicle under the base of the vehicle towards the side of the frame, wherein a second, similar pair of spraying arms is also pivotably disposed about vertical pivoting axes on the opposing sides of the frame, wherein the spraying arms have drivingly coupled thereto actuating motors by means of which the spraying, arms can be swung in under the base of the vehicle into their swung-in position running transversely to the longitudinal direction of the vehicle and swung out into a second, swung-out position running parallel to the longitudinal direction of the vehicle, and wherein there is provided a control device which detects the vehicle wheels and activates the actuating motors, by means of which control device the spraying arms are drivable by the actuating motors in such a way that each of the spraying arms may be swung out from its swung-in position into its swung-out position before reaching a vehicle wheel, is held in its swung-out position while passing the vehicle wheel, and can be brought back into its swung-in position after passing the vehicle wheel.

2. The device as claimed in claim 1, wherein the spray nozzles on the spraying arms are each disposed such that in the swung-out position their spray jets are directed obliquely upwards towards the vehicle.

3. The device as claimed in claim 1, wherein the two spraying arms located on the same side of the frame may each be swung in the same rotational direction, but in doing so the one spraying arm is swung in and vice versa.

4. The device as claimed in claim 1, wherein the pivoting axes of the two spraying arms provided on the same side of the frame are spaced at a reciprocal distance which corresponds approximately to the length of the horizontal chord of a vehicle wheel at the level of the spraying arms.

5. The device as claimed in claim 4, wherein the two spraying arms provided on the same side of the frame have coupled thereto a common actuating motor.

6. The device as claimed in claim 1, wherein the two spraying arms provided on the same side of the frame are pivotable about a common vertical axis.

7. The device as claimed in claim 6, wherein the two spraying arms provided on the same side of the frame are placed at right angles to each other and are rigidly connected, the spraying arms being able to be slowly swung by a common actuating motor while moving past a vehicle wheel.

8. The device as claimed in claim 1, wherein the pivoting axes of the two spraying arms provided on the same side of the frame are located adjacent to each other.

9. The device as claimed in claim 1, wherein the pivoting axes of the two spraying arms provided on the same side of the frame are spaced at a reciprocal distance which approximately corresponds to the length of a spraying arm.

10. The device as claimed in claim 1, wherein in a starting or final position of the frame, all the spraying arms can be brought into their swung-out positions.

* * * * *